(12) United States Patent
Smith et al.

(10) Patent No.: US 6,820,254 B2
(45) Date of Patent: Nov. 16, 2004

(54) METHOD AND SYSTEM FOR OPTIMIZING CODE USING AN OPTIMIZING COPROCESSOR

(75) Inventors: Jack Robert Smith, South Burlington, VT (US); Sebastian Theodore Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 09/681,327

(22) Filed: Mar. 19, 2001

(65) Prior Publication Data

US 2002/0147970 A1 Oct. 10, 2002

(51) Int. Cl.[7] .............................................. G06F 9/45
(52) U.S. Cl. ..................... 717/151; 717/153; 717/159
(58) Field of Search ................................ 717/106–108, 717/143–161, 136–149; 712/228–229, 232–237; 709/106–108

(56) References Cited

U.S. PATENT DOCUMENTS

| | | | |
|---|---|---|---|
| 4,374,417 A | | 2/1983 | Bradley et al. |
| 5,452,457 A | | 9/1995 | Alpert et al. |
| 5,768,593 A | | 6/1998 | Walters et al. |
| 5,835,775 A | | 11/1998 | Washington et al. |
| 5,890,013 A | | 3/1999 | Nair et al. |
| 5,933,641 A | | 8/1999 | Ma |
| 6,014,515 A | | 1/2000 | Burch |
| 6,075,939 A | * | 6/2000 | Bunnell et al. ............. 717/107 |
| 6,314,560 B1 | * | 11/2001 | Dunn et al. ................. 717/153 |
| 6,339,840 B1 | * | 1/2002 | Kothari et al. ............. 717/149 |
| 6,615,303 B1 | * | 9/2003 | Endo et al. ................. 710/260 |

OTHER PUBLICATIONS

Chou et al., "Instruction Path Coprocessors", Carnegie Mellon University, Department of ECE, pp. 1–24, Mar. 2000.*
Chow et al., "Instruction Path Coprocessors", ACM, Proceedings of the 27th annual international symposium on Computer architecture, pp.: 270–281, May 2000.*
Chow et al., "PipeRench Implementation of the Instruction Path Coprocessor", IEEE, pp.: 147–158, Dec. 2000.*
Patel et al., "rePLay: A Hardware Framework for Dynamic Program Optimization", CiteSeer, http://citeseer.nj.nec.com/patel99replay.html, pp.: 1–26, Dec. 1999.*

* cited by examiner

Primary Examiner—Tuan Dam
Assistant Examiner—Ted T. Vo
(74) Attorney, Agent, or Firm—Richard A. Henkler; Dillon & Yudell LLP

(57) ABSTRACT

A data processing system includes a central processing unit (CPU) in communication with a system memory. Within the system memory, there is stored legacy code that does not utilize the full features of the CPU. The data processing system also includes a code-optimizing coprocessor in communication with the CPU and the system memory. Control logic within the code-optimizing coprocessor causes the code-optimizing coprocessor to generate optimized code from the legacy code at the same time the CPU executes the legacy code, such that the optimized code is tailored according to the CPU. After the code-optimizing coprocessor has generated at least some optimized code, the code-optimizing coprocessor causes the CPU to automatically utilize at least some optimized code in lieu of at least some of the legacy code.

5 Claims, 4 Drawing Sheets

METHOD AND SYSTEM FOR OPTIMIZING CODE USING AN OPTIMIZING COPROCESSOR

BACKGROUND OF THE INVENTION

1. Technical Field

The present invention relates to processing instructions In general, and in particular to processing instructions within a computer system. Still more particularly, the present invention relates to a method and system for optimizing code using an optimizing coprocessor within a computer system.

2. Description of the Prior Art

The computer industry is continuously developing new and improved hardware and software for data processing systems. In many cases, software is written for a particular type of hardware architecture. When updated hardware or software is released, the hardware or software that is being superseded is known as legacy hardware or software. In addition, even when referring to the most current release of a software package, if that release is designed for a superseded hardware architecture, the software is known as legacy software.

In order to protect a customer's investment in software, when hardware developers introduce an updated hardware architecture they usually design it to be backward compatible with prior machine instructions so customers can run legacy code on it. The processor is placed on the market with the potential of achieving great performance once the new software is obtained but in many cases the customer never does purchase the new software so the performance gain is never realized. Therefore, there is a need to realize these gains sooner without requiring users to upgrade their software.

One approach to optimizing legacy software is by generating an optimized copy of an entire legacy application before executing that application, either in response to a demand for the application or in advance of any actual request for the application. For example, a computer system may automatically generate an optimized copy of an entire application in response to a user initiating that application. However, such approach introduces an undesirable delay into the initiation process such that the user is forced to wait for the optimization to finish before the application can start execution.

Another approach to optimizing legacy software involves an approach known as in-stream or just-in-time code optimization. According to in-stream code optimization, the process of fetching and executing instructions includes an intermediate optimization step interposed between the fetch step and the execute step for each instruction. In-stream optimization reduces the duration of the delay experienced upon initiation of an application, relative to en-masse optimization. One disadvantage of in-stream optimization, however, is that system performance is decreased due to processing cycles that are consumed by the optimization steps.

The present disclosure provides an improved method for performing optimization without delaying the process of initiating legacy software and without decreasing system performance.

BRIEF SUMMARY OF THE INVENTION

In accordance with a preferred embodiment of the present invention, a data processing system includes a central processing unit (CPU) in communication with a system memory. Within the system memory, there is stored legacy code that does not utilize the full features of the CPU. The data processing system also includes a code-optimizing coprocessor in communication with the CPU and the system memory. Control logic within the code-optimizing coprocessor causes the code-optimizing coprocessor to generate optimized code from the legacy code at the same time the CPU executes the legacy code, such that the optimized code is tailored according to the CPU. After the code-optimizing coprocessor has generated at least some optimized code, the code-optimizing coprocessor causes the CPU to automatically utilize at least some optimized code in lieu of at least some of the legacy code.

All objects, features, and advantages of the present invention will become apparent in the following detailed written description.

BRIEF DESCRIPTION OF SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4A shows the contents and tag bits prior to optimization; and

FIG. 4B shows the contents and tag bits after optimization.

DETAILED DESCRIPTION OF THE INVENTION

Figure 1:
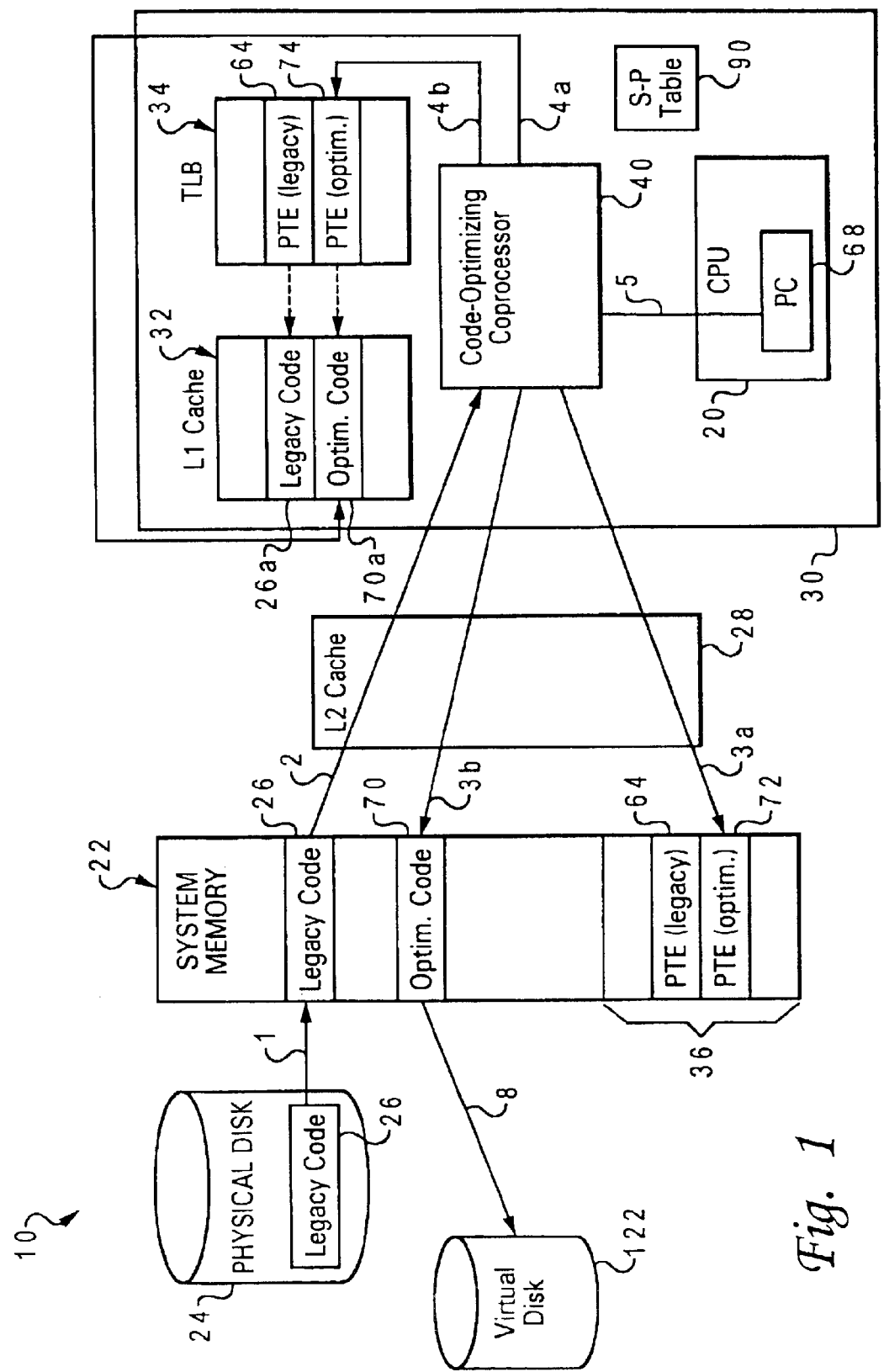
FIG. 1 is a block diagram of a data processing system with exemplary code-optimizing facilities in accordance with the present invention.

With reference now to the figures, and in particular with reference to FIG. 1, there is depicted an illustrative data processing system 10 with facilities in accordance with the present invention for optimizing code. As shown, data processing system 10 includes a CPU 20 that is connected, via a system bus (not illustrated) to system memory 22. Also included in data processing system 10 is physical disk 24, which is composed of one or more data storage devices connected to system 10 via one or more local buses and one or more intermediate bus bridges (not illustrated). Although not illustrated, input/output (I/O) devices (such as a keyboard, a mouse, a display device, a communication port, and/or other I/O equipment) may also be connected to one or more of the local buses. In addition, a level-two (L2) cache 28 and a level-three (L3) cache (not illustrated) may be connected to CPU 20 via the system bus.

The physical disk 24 is a non-volatile storage device, such as a disk drive or CD, that holds the legacy code. Legacy code 26 is the compiled instructions (e.g., an application) that does not take full advantage of the processing resources provided by data processing system 10. In the illustrative embodiment, legacy code 26 was designed for a predecessor processor to CPU 20 and therefore fails to fully utilize the new architecture features of CPU 20.

CPU 20 resides in an integrated circuit (IC) 30 that also contains a level-one (L1) cache 32 and a translation look-aside buffer (TLB) 34. L1 cache 32 serves as a high-speed storage area for data and instructions utilized by CPU 20. TLB 34 is a cache that holds logical to physical address translations for recent memory fetches made by the CPU 20. Specifically, TLB 34 contains a number of page table entries (PTEs), and each PTE associates a particular logical address with a corresponding physical address. The PTEs in TLB 34 are a subset of a greater number of PTEs which are maintained in a page table 36 in system memory 22.

According to the present invention, data processing system 10 also includes a code-optimizing coprocessor 40. Preferably, code-optimizing coprocessor 40 resides in IC 30 with CPU 20; although, in alternative embodiments, code-optimizing coprocessor 40 and CPU 20 may reside in separate ICs that have been designed to support the communication paths required to support the operations of the present invention described herein.

Figure 2:
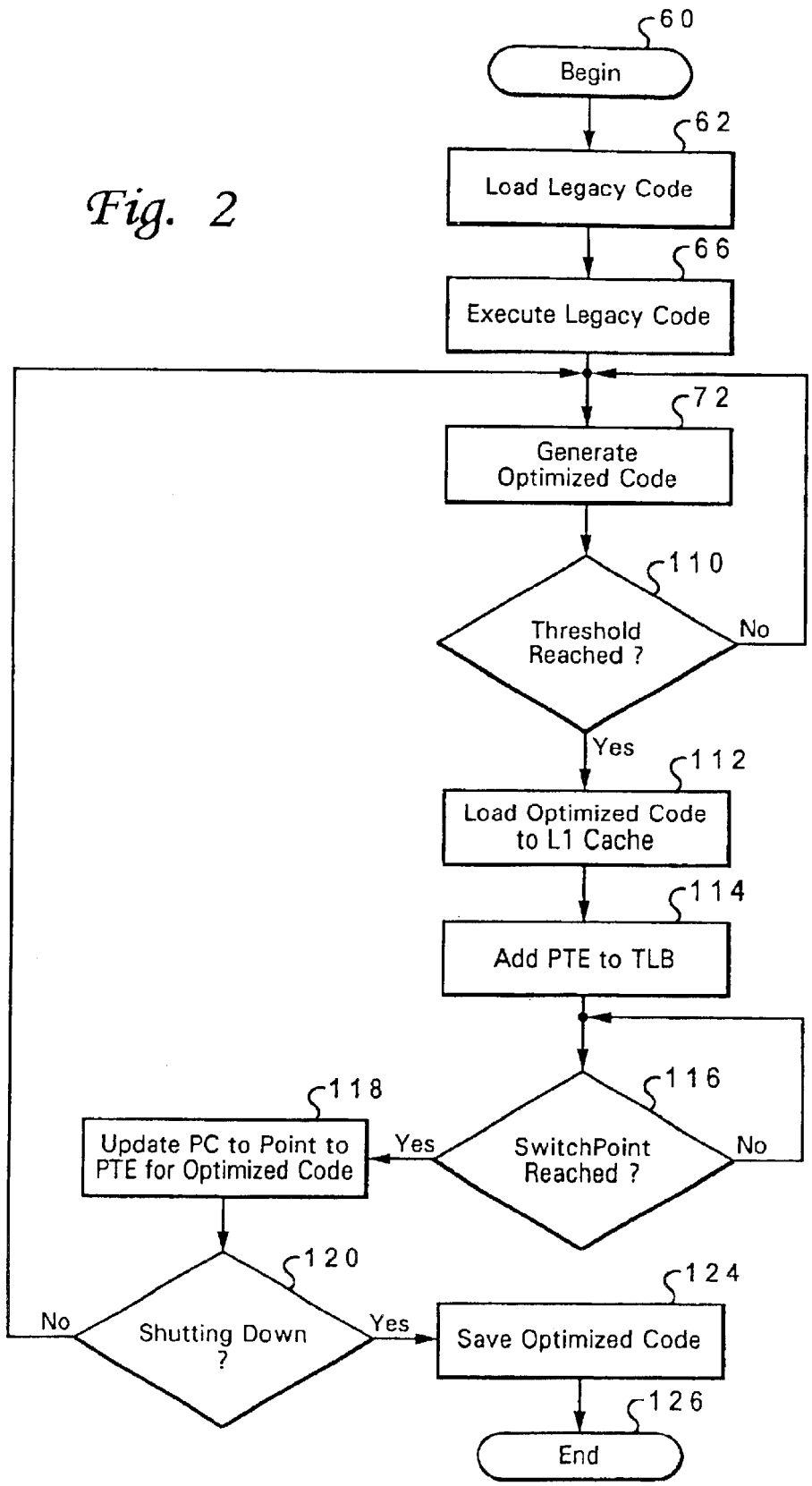
FIG. 2 is a high-level logical flow diagram depicting a method for optimizing code, in accordance with a preferred embodiment of the present invention.

Referring now to FIG. 2, there is illustrated a high-level flow diagram of an exemplary process, in accordance with the present invention, for optimizing code in a data processing system such as data processing system 10. That process begins at block 60 with data processing system 10 preparing to begin executing legacy code 26. For example, data processing system 10 may start the illustrated process in response to user input that requests execution of a legacy word-processing application, in response to execution of a startup sequence that identifies a legacy Internet-server application as a default startup application, or in response to other circumstances. Data processing system 10 prepares to execute legacy code 26 by first loading legacy code 26 into system memory 22, as depicted at block 62. As illustrated in FIG. 1 by arrow 1, in the illustrative embodiment legacy code 26 is obtained from physical disk 24.

When legacy code 26 is loaded into system memory, page table 36 is updated with at least one PTE 64 that associates the physical address of legacy code 26 in memory 22 with a corresponding logical address. Further, as will be apparent to those of ordinary skill in the art, legacy code 26 (or portions thereof) may also be copied into one or more intermediate-level caches (such as L2 cache 28 and an L3 cache). Then, as shown at block 66, the logical address of the first instruction of legacy code 26 is loaded into the program counter 68 within CPU 20, and CPU 20 begins executing legacy code 26 by retrieving that instruction from system memory 22 and then executing that instruction. CPU then continues to execute instructions from legacy code 26, incrementing program counter 68 as appropriate and calling new lines of legacy code 26 into L1 cache 32 and any PTE 64 into the TLB 34, in a manner similar to that followed in conventional data processing systems.

In contrast to conventional systems, however, while CPU 20 is executing legacy code 26, code-optimizing coprocessor 40 generates optimized code 70 from legacy code 26, as depicted at block 72. In particular, with reference to FIG. 1, code-optimizing coprocessor 40 utilizes optimization logic to create optimized code 70 which, when executed, will produce the same end results as legacy code 26, but which takes advantage of the new architecture features of CPU 20 to attain those end results more rapidly and/or efficiently.

In particular, according to the illustrative embodiment, code-optimizing coprocessor 40 retrieves legacy instructions from legacy code 26 in system memory 22 (as indicated by arrow 2) and allocates at least one new page for optimized code 70 in system memory 22. Accordingly, a PTE 72 will be added to page table 36 for each of the one or more new pages, as indicated by arrow 3a. Then, utilizing the above-described optimization logic, code-optimizing coprocessor 40 begins converting the legacy instructions into optimized instructions. In the illustrative embodiment, code-optimizing coprocessor 40 stockpiles those optimized commands in system memory 22, as illustrated by arrow 3b.

The optimization logic of code-optimizing coprocessor 40 preferably includes logic for considering the architecture features of CPU 20, for identifying optimized instructions that can be used in lieu of corresponding legacy instruction to improve performance, and for determining which optimized and legacy instructions will have matching contexts and may therefore be included in a switch-point table 90 (described below with reference to FIG. 4). Preferably, code-optimizing coprocessor 40 considered numerous factors when generating optimized code, including (1) the number and type of available execution units (e.g., four integer processing units, two floating point processing units, two multimedia processing units, etc.) (2) the latency of the various operations (e.g., one cycle for add, three cycles for multiply, etc.), and (3) the number of available registers, ports on register files, caches, etc. Code-optimizing coprocessor 40 may also consider other factors influencing how much parallelism CPU 20 is equipped to handle, how quickly operations execute, and/or the limits for getting data to and from CPU 20.

Utilizing this information, code-optimizing coprocessor 40 analyzes legacy code 26 to find a faster and/or more efficient way to schedule the instructions. Preferably, the optimized instructions utilize more resources in parallel to prevent processing units from sitting idle and to reduce pipeline stalls. For example, code-optimizing coprocessor 40 may use conventional optimization techniques such as loop unrolling to improve the instruction stream. In addition, since code-optimizing coprocessor 40 operates independently of CPU 20, there is no penalty for creating optimizing code 70, and the system benefits from the optimization once CPU 20 begins executing optimized code 70. For example, code-optimizing coprocessor 40 may operate at a different clock speed from CPU 20 and may be isolated from occurrences within the main system such as interrupts and exceptions. Also, the optimization logic may be hardwired into code-optimizing coprocessor 40, or code-optimizing coprocessor 40 may include a microcontroller that executes an optimization algorithm stored in a non-volatile memory, such as read-only memory (ROM).

CPU 20 and code-optimizing coprocessor 40 both have access to system memory 22. Consequently, system memory 22 is preferably multi-ported (e.g., with two read ports and two write ports) so that both processors may access it simultaneously. Alternatively, code-optimizing coprocessor 40 may issue a priority interrupt to the memory subsystem whenever access to system memory 22 is needed, with the memory subsystem granting access when CPU 20 is not using the memory bus.

Code-optimizing coprocessor 40 should also be able to detect self-modifying code (i.e., legacy instructions that are changed after being loaded into system memory 22) and react appropriately thereto. For example, CPU 20 might be designed to notify code-optimizing coprocessor 40 directly when code has modified itself, or code-optimizing coprocessor 40 might monitor writebacks to system memory 22 from cache to detect when code has been modified. Detection of modified code would cause code-optimizing coprocessor 40 to correct any optimized code rendered invalid by the change or to disable optimization for the entire section of self-modified code.

In addition, according to the present invention, the process of generating optimized code includes the sub-process of creating switch-point table 90, which associates certain legacy instructions with corresponding optimized instructions. Referring now to FIG. 2, there is illustrated an exemplary switch-point table 90 and a diagram 92 illustrating how that table reflects a logical relationship between an exemplary legacy instruction stream 94 and a corresponding optimized instruction stream 96. Any appropriate data structure could be used to store the data that links legacy instructions to optimized instructions, including, for example, a two-dimensional array, a one-dimensional list of optimized-instruction addresses indexed by legacy-instruction addresses, etc.

Figure 3A:
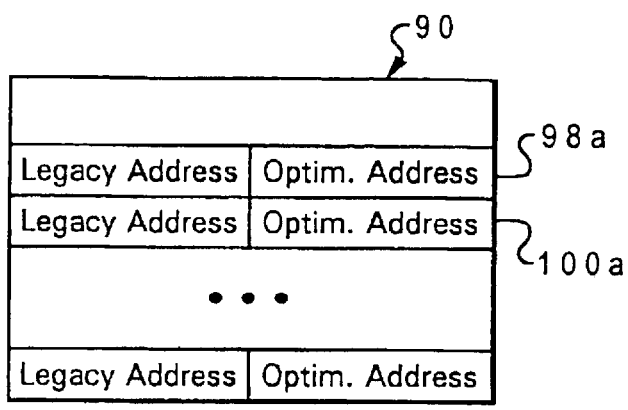
FIG. 3A is lookup table (switch point table) implemented in the data processing system of FIG. 1 to dynamically switch from executing legacy code to optimized code.
Figure 3B:
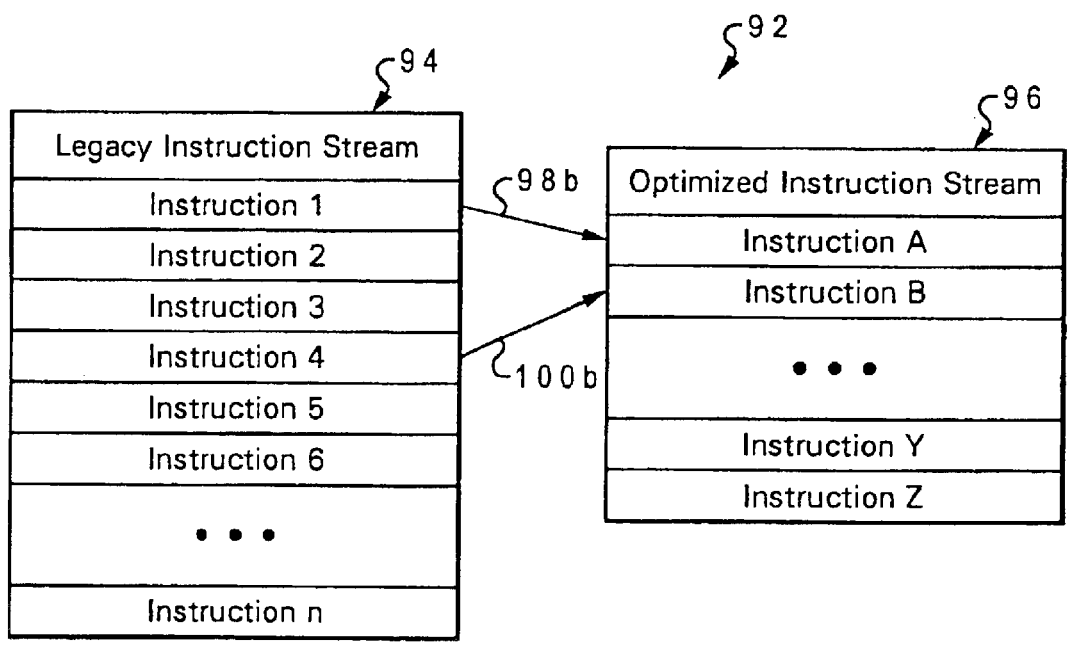
FIG. 3B shows a sequence of instructions in the legacy code and switchpoints to architecturally equivalent points in the optimized code.

In FIG. 3, switch-point table 90 is implemented as a two-dimensional array, and each entry in switch-point table 90 identifies an instruction within legacy instruction stream 94 and a corresponding instruction within optimized instruction stream 96, where the legacy instruction is expected to have a context (e.g., register contents, etc.) that matches the context required by the corresponding optimized instruction. For example, switch-point entry 98*a* (and arrow 98*b*) indicate that legacy instruction 1 and optimized instruction A will have matching contexts, and switch-point entry 100*a* (and arrow 100*b*) indicate that legacy instruction 4 and optimized instruction B will have matching contexts. As illustrated, even though the instructions in legacy instruction stream 94 and optimized instruction stream 96 will not exactly match, switch-point table 90 identifies locations within legacy code 26 at which execution can be switched from one particular legacy-code instruction to a corresponding optimized instruction with the assurance that the processor is at the same architectural state at this point in both instruction streams.

Referring again to FIG. 2, as code-optimizing coprocessor 40 is generating optimized code, code-optimizing coprocessor 40 monitors how much optimized code has been generated, in relation to how much legacy code has been executed by CPU 20, as illustrated at block 110. That is, code-optimizing coprocessor 40 determines whether the stockpile of optimized instructions has surpassed the legacy instruction being executed by CPU 20 to the extent there now exists a reasonably large buffer of optimized instructions following the current point of execution. If code-optimizing coprocessor 40 determines that such a threshold has not yet been reached, code-optimizing coprocessor 40 continues to generate optimized code, as indicated by the arrow returning to block 72.

However, as depicted at block 112 (and indicated by arrow 4*a* in FIG. 1), if the threshold has been reached, code-optimizing coprocessor 40 utilizes conventional protocols to pre-load some of optimized code 70 into the lower-level caches. Preferably, code-optimizing coprocessor 40 also pre-loads a certain amount of instructions from optimized code 70 (e.g., one optimized-code page 70*a*) to L1 cache 32 and, as depicted at block 114 (and indicated by arrow 4*b* in FIG. 1), directly writes the PTE 74 for optimized-code page 70*a* into TLB 34.

In the illustrative embodiment, code-optimizing coprocessor 40 utilizes the system bus and the memory subsystem to load L1 cache 32, with the memory subsystem monitoring the state of CPU 20 and using standard direct memory access (DMA) cycles to transfer the data when CPU 20 is not using the system bus. Also, according to the present invention, IC 30 includes a DMA path to TLB 34 and code-optimizing coprocessor 40 utilizes those DMA paths to add PTE 74 to TLB 34.

As depicted at block 116, after PTE 74 has been added to TLB 34, code-optimizing coprocessor 40 consults switch-point table 90 to determine whether the instruction referenced by program counter 68 qualifies as a switch-point. (Additional details regarding how it is determined that a switch-point has been reached in the illustrative embodiment are described below with reference to FIGS. 4A and 4B.) If that instruction is not identified as a switch-point, code-optimizing coprocessor 40 continues to monitor program counter 68 to ascertain when a switch-point has been reached. If it is determined that a switch-point has been reached, code-optimizing coprocessor 40 utilizes the DMA path to program counter 68 to replace the logical address of the legacy instruction with the logical address of the corresponding optimized instruction, as illustrated at block 118 (and indicated by arrow 5 in FIG. 1). When CPU 20 next fetches an instruction, PTE 74 will cause that instruction to be retrieved from optimized-code page 70*a*, and CPU 20 will thereafter executed optimized code 70 in lieu of legacy code 26.

As illustrated at block 120, the process also includes a step of determining whether data processing system 10 is shutting down, for example as a result of a power-save mode being initiated. If the system is not shutting down, code-optimizing coprocessor 40 continues to optimize the legacy code to keep ahead of the current point of execution, as indicated by the arrow leading back to block 72. Otherwise, according to the illustrative embodiment, data processing system 10 saves at least a portion of optimized code 70 in a non-volatile memory, referred to herein as a virtual disk 122, as depicted at block 124. The process then ends, as indicated at block 126.

In alternative embodiments, code-optimizing coprocessor 40 may also provide differing degrees of optimization. For example, a minimum amount of optimization may be performed when an application is initiated, thereby allowing optimized code to be produced most rapidly. Then, as the stockpile of optimized code grows, code optimizing coprocessor 40 may perform more thorough optimization of subsequent instructions (for example, considering larger blocks of legacy instructions together). In this manner, code-optimizing coprocessor 40 accommodates the need for rapid transition to optimized code, while providing more effective optimization when circumstance allow.

Figure 4A:
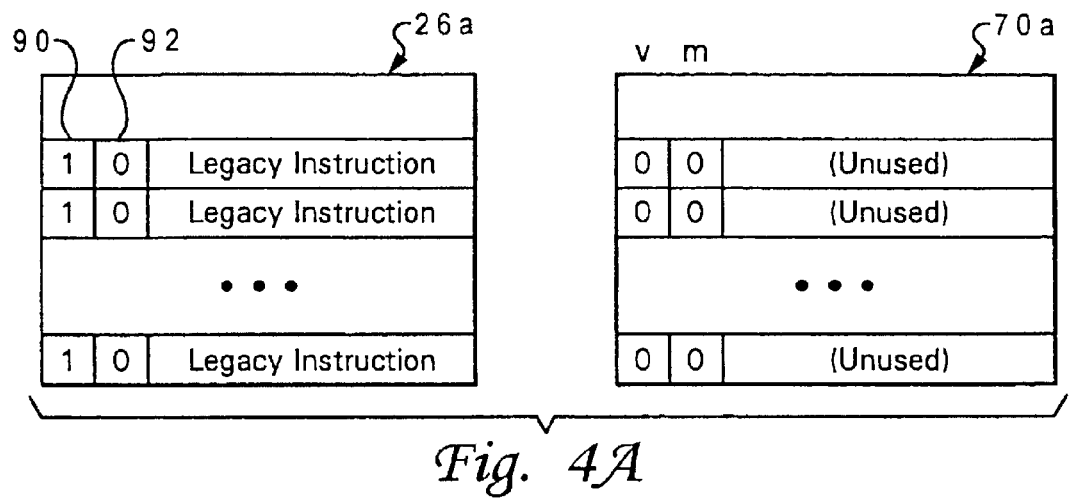
FIGS. 4A and 4B are pictorial representations of two pages in memory.
Figure 4B:
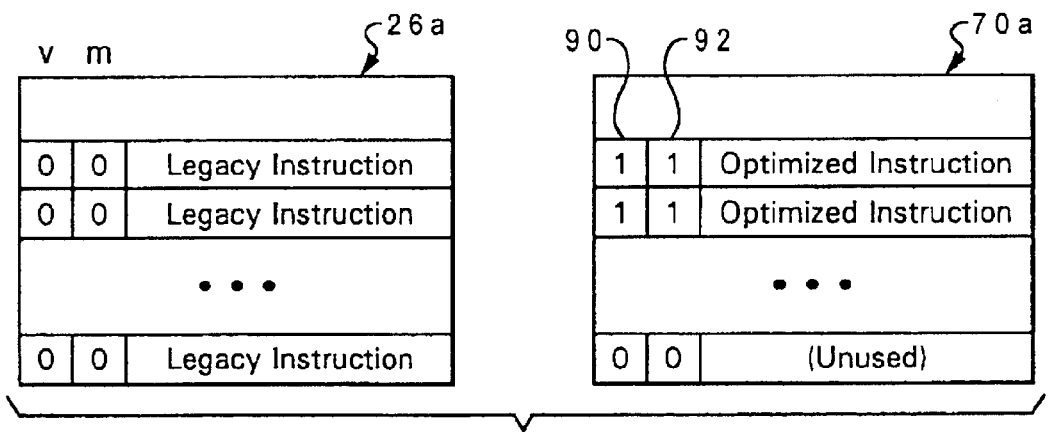

With reference now also to FIGS. 4A and 4B, legacy-code page 26*a* and optimized-code page 70*a* are depicted in greater detail, within the context of one of the caches of data processing system 10 (such as L1 cache 32). As shown, memory pages in a cache are subdivided into records or lines, and each line includes a valid tag 90 and a modified tag 92. The valid tags indicate which lines contain valid data. The modified (or dirty) tags indicate which lines have been modified since being loaded into the cache. The modified tags may therefore be utilized to determine which pages should be rewritten to system memory 22 before being replaced in the cache with new memory pages.

When legacy-code page 26*a* is first copied into L1 cache 32, each non-empty line is flagged as valid and not modified. Also, when optimized-code page 70*a* is first allocated, each line therein is flagged as invalid and not modified. This configuration is illustrated in FIG. 4A. FIG. 4B shows that, as code-optimizing coprocessor 40 generates lines of optimized code, code-optimizing coprocessor 40 adds those lines to optimized-code page 70*a*, marks those lines as valid and modified in optimized-code page 70*a*, and marks the corresponding lines in legacy-code page 26*a* as invalid. This optimization is performed at the same time CPU 20 is executing legacy-code page 26*a*.

In an alternative embodiment, while code-optimizing coprocessor 40 is generating switch-point table 90, code-optimizing coprocessor 40 is also loading a switch-point buffer with a number of switch-points. For example, the switch-point buffer may be loaded after generation of a predetermined number of optimized instructions following the current point of execution in legacy code page 26*a*. That number may be less than the number of instructions in a full page. DMA may be utilized to load the switch-point buffer, or the switch-point buffer may be implemented as a collection of I/O mapped registers that are loaded via an I/O serial port. Alternatively, switch-point table 90 itself may be implemented as a collection of I/O mapped registers or loaded via DMA.

Code-optimizing coprocessor 40 includes a safe-transition comparator that monitors the index of the current point of execution within legacy-code page 26*a*. When the current point of execution reaches a switch-point, the linear address of the optimized instruction at that switch-point is loaded into program counter 68, as described with relation to block 116 of FIG. 2.

Thereafter, data processing system 10 enjoys the performance improvement of optimized code 70. Further, if optimized-code page 70*a* has been pre-loaded into L1 cache 32 (as described above), no cache-miss penalty is incurred when transition from legacy code 26 to optimized code 70.

Once the switch has been made, the illustrative embodiment provides for improved overall cache performance by marking legacy-code page 26*a* for removal from the cache. For example, code-optimizing coprocessor 40 could utilize a register to indicate which legacy-code page was last switched from, and the cache control logic could mark that page as least recently used (LRU).

In the illustrative embodiment, at least part of optimized code 70 may be preserved upon system shutdown, as described above with reference to block 124 of FIG. 2. When the system is subsequently restarted, the preserved code may be used automatically, or the user may be prompted to decide whether or not to use the preserved, optimized code.

Further, the illustrative embodiment provides startup options with which a user can identify applications to be at least partially optimized at initiation, such that, even at initiation, the legacy code for that application is not executed.

As has been described, the present invention automatically optimizes legacy software without delaying the process of initiating that software and without decreasing system performance. Although the present invention has been described with reference to an exemplary embodiment, this description is not meant to be construed in a limiting sense. Various modifications of the disclosed embodiment, as well as alternative embodiments of the present invention, will become apparent to persons skilled in the art upon reference to the description of the present invention.

For instance, in the illustrative embodiment, the code-optimizing coprocessor obtains the legacy instructions from system memory 22; however, in alternative embodiments, the code-optimizing coprocessor could obtain the legacy code from L1, L2 and/or L3 caches. Further, although the data structures and functional components of the exemplary embodiment have been described as residing in particular relative locations within the data processing system, those of ordinary skill in the art will appreciate that certain of those data structures and/or functions could redistributed with the data processing system without departing from the present Invention. It should also be understood that the types of data processing systems with which the present invention could be utilized include, without limitation, multi-processor systems, mini-computers, and mainframe computers.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:

a system memory for storing legacy code;

a central processing unit (CPU) in communication with said system memory;

a code-optimizing coprocessor in communication with said system memory and said CPU, wherein said code-optimizing coprocessor generates a plurality of optimized code from said legacy code to be stored within said system memory while said CPU is executing said legacy code, wherein said plurality of optimized code is more optimized for execution within said CPU than said legacy code; and means for switching an execution of said legacy code by said CPU to an execution of said plurality of optimized code, in response to an encounter of a switch point.

2. The data processing system of claim 1, wherein said data processing system further includes a switch point table for storing said switch point and other switch points, wherein said switch points identify specific instructions within said legacy code at which execution can be switched from said legacy code to said plurality of optimized code without any change to an architectural state of said CPU.

3. The data processing system of claim 1, wherein said data processing system further comprises a translation look-aside buffer (TLB); and means for generating a page-table entry (PTE) for said plurality of optimized code in said TLB.

4. The data processing system of claim 3, wherein said CPU further comprises a program counter, wherein said code-optimizing coprocessor alters said program counter to point to said PTE for said plurality of optimized code after said PTE has been generated for said plurality of optimized code in said TLB, thereby causing said CPU to automatically utilize said plurality of optimized code in lieu of said legacy code.

5. The data processing system of claim 1, wherein said data processing system further comprises a level-one (L1) cache for storing a subset of said plurality of optimized code.

* * * * *